(12) United States Patent
Manousos et al.

(10) Patent No.: US 7,739,306 B2
(45) Date of Patent: Jun. 15, 2010

(54) METHOD AND APPARATUS FOR CREATING, ASSEMBLING, AND ORGANIZING COMPOUND MEDIA OBJECTS

(75) Inventors: Nicholas H. Manousos, Santa Cruz, CA (US); R. Travis Atkins, Santa Cruz, CA (US); Abhishek Tiwari, Santa Cruz, CA (US)

(73) Assignee: Verisign, Inc., Mountain View, CA (US)

( * ) Notice: Subject to any disclaimer, the term of this patent is extended or adjusted under 35 U.S.C. 154(b) by 311 days.

(21) Appl. No.: 11/105,872

(22) Filed: Apr. 13, 2005

(65) Prior Publication Data

US 2005/0234981 A1 Oct. 20, 2005

Related U.S. Application Data

(60) Provisional application No. 60/562,351, filed on Apr. 14, 2004.

(51) Int. Cl.
*G06F 17/30* (2006.01)
*G06F 17/00* (2006.01)

(52) U.S. Cl. .................. 707/796; 999/107; 999/104; 345/98

(58) Field of Classification Search .......... None
See application file for complete search history.

(56) References Cited

U.S. PATENT DOCUMENTS

| | | | |
|---|---|---|---|
| 4,408,200 A | 10/1983 | Bradley | |
| 4,451,824 A | 5/1984 | Thayer et al. | |
| 5,404,316 A | 4/1995 | Klingler et al. | |
| 5,666,503 A | 9/1997 | Campanelli et al. | |
| 5,751,613 A | 5/1998 | Doty et al. | |
| 5,844,542 A | 12/1998 | Inoue et al. | |
| 5,889,519 A | 3/1999 | Boezeman et al. | |
| 5,940,077 A * | 8/1999 | Amro | 715/800 |
| 6,025,827 A | 2/2000 | Bullock et al. | |
| 6,028,603 A * | 2/2000 | Wang et al. | 715/776 |
| 6,070,167 A | 5/2000 | Qian et al. | |
| 6,161,115 A | 12/2000 | Ohanian | |
| 6,188,400 B1 | 2/2001 | House et al. | |
| 6,195,101 B1 | 2/2001 | Ghislain Bossut et al. | |
| 6,201,548 B1 | 3/2001 | Cariffe et al. | |
| 6,260,040 B1 | 7/2001 | Kauffman et al. | |
| 6,600,869 B1 | 7/2003 | Chen et al. | |
| 6,686,918 B1 | 2/2004 | Cajolet et al. | |
| 6,750,890 B1 | 6/2004 | Sugimoto | |
| 7,062,497 B2 | 6/2006 | Hamburg et al. | |
| 7,149,755 B2 * | 12/2006 | Obrador | 707/104.1 |
| 7,336,264 B2 | 2/2008 | Cajolet et al. | |
| 7,441,182 B2 | 10/2008 | Beilinson et al | |

(Continued)

OTHER PUBLICATIONS

Bederson, Benjamin. "PhotoMesa: A zoomable Image Browser Using Quantum Treemaps and Bubblemaps", ACM, 2001, p. 71-79.*

(Continued)

*Primary Examiner*—Charles Rones
*Assistant Examiner*—Yuk Ting Choi
(74) *Attorney, Agent, or Firm*—Blakely, Sokoloff, Taylor & Zafman, LLP; Judith A. Szepesi

(57) ABSTRACT

A method and apparatus for assembling and organizing media objects is described.

19 Claims, 11 Drawing Sheets

U.S. PATENT DOCUMENTS

| | | | |
|---|---|---|---|
| 2002/0047856 A1* | 4/2002 | Baker | 345/700 |
| 2002/0156815 A1 | 10/2002 | Davia | |
| 2002/0167546 A1* | 11/2002 | Kimbell et al. | 345/790 |
| 2003/0023632 A1 | 1/2003 | Ries et al. | |
| 2003/0033296 A1* | 2/2003 | Rothmuller et al. | 707/3 |
| 2003/0074634 A1 | 4/2003 | Emmelmann | |
| 2003/0225764 A1 | 12/2003 | Smith et al. | |
| 2004/0066410 A1 | 4/2004 | Lindhorst et al. | |
| 2004/0070619 A1 | 4/2004 | Yoshio et al. | |
| 2004/0078761 A1 | 4/2004 | Ohanian | |
| 2004/0169681 A1 | 9/2004 | Van Kesteren et al. | |
| 2004/0199543 A1 | 10/2004 | Braud et al. | |
| 2004/0205488 A1 | 10/2004 | Fry | |
| 2004/0217985 A9 | 11/2004 | Ries et al. | |
| 2005/0049968 A1 | 3/2005 | Porter | |
| 2005/0234838 A1 | 10/2005 | Manousos et al. | |
| 2005/0235212 A1 | 10/2005 | Manousos et al. | |
| 2007/0157102 A1 | 7/2007 | Hasegawa et al. | |
| 2007/0186157 A1 | 8/2007 | Walker et al. | |

OTHER PUBLICATIONS

Bederson, Benjamin. "PhotoMesa: A Zoomable Image Browswer Using Quantum Treemaps and Bubblemaps", ACM, 2001.*

"DIG35-Metadata for Digital Images Annex C: Content Description Metadata" Digital Imaging Group, Mar. 2000, p. 44-57.

PCT International Search Report for PCT/US2005/012772.

PCT International Search Report for PCT/US2005/012771.

Kohntopp, Kristian, "Von HTML zu PHP: Schreibe Formularverarbeitungen in Normalform", Aug. 2003, http:/web.archive.org/web/20030810025438/http://www.php-faq.de/q/q-stil-normalform.html.

Taylor, Andrew, et al, "Javascript function to submit form?", Sep. 2001, http://groups.google.de/group/comp.lang.javascript/browse_thread/thread/cb8897df08750c2c/94b30a3ace936bd0?Ink=st&q=javascript+onchange+submit+form&mum=1&hl=de#94b30a3ace936bd0.

PCT International Search Report for PCT/US2005/012773 (3 pgs).

Rice, James, et al., "Using the Web Instead of a Window System", 1996, ACM Press, New York, NY, USA, Conference on Human Factors in Computing Systems, pp. 103-110.

Maurer, Frank, "Engineering Web Applications with Java", 2002, Encyclopedia of Software Engineering, "Section 4: Application Tier Technologies," 3 pgs.

PCT/US05/12771, The International Search Report and the Written Opinion of the International Searching Authority, mailed Apr. 14, 2008, 9 pages.

Xu, Xianghua, et al., "Group undo framework and algorithms in real-time collaborative image editing systems," Systems, Man, and Cybernetics, Oct. 5-8, 2003. IEEE International Conference, vol. 3, pp. 2187-2192.

PCT/US/05/12773, International Preliminary Report, Jan. 30, 2008, 7 pages.

PCT/US/05/12773, International Preliminary Report, Mar. 28, 2008, 6 pages.

Hurwitz, Dan, et al., "Programming ASP.NET," ISBN 0-596-00171-1, Feb. 2002, 32 pages.

Barret, William A, et al, "Object-based Image Editing," Proc of the 29th Annual Conf on Computer Graphics and Interactive Techniques, San Antonia, TX, Jul. 23-26, 2002, pp. 777-784.

Boust, Clotilde, et al, "Color Correction Judgements of Digital Images by Experts and Naïve Observers," Digital Photography Conf, IS&T PICS 2003, Rochester, NY, May 13, 2003, pp. 4-8.

Grundy, John, et al, "Building Multi-Device, Component-Based, Thin-Client Groupware: Issues and Experiences," Australian Computer Science Communications, vol. 24, Issue 4, Jan./Feb. 2002, pp. 71-80.

Microsoft Computer Dictionary, 5th Edition, Microsoft Press, Redmond, WA, © 2002, pp. 260 and 564.

Seitz, Steven M, et al, "Plenoptic Image Editing," International Journal of Computer Vision, vol. 48, No. 2, Jul. 2002, pp. 115-129.

Speegle, Greg, et al, "A Meta-Structure for Supporting Multimedia Editing in Object-Oriented Databases," BNCOD 16, Cardiff, Wales, UK, Jul. 6-8, 1998, pp. 89-102.

* cited by examiner

Current Album: Tokyo

Name:
Joe and his dog

Send To

Current Album: Tokyo

Send To

Current Album: Tokyo

Add Note

Send To

Current Album: Tokyo

Name:
Joe and his dog

Send To  190

From:   UserXXXX

To:     [                    ]  195
        Enter one or more destination addresses Title:  [                    ]

Message: [                   ]

METHOD AND APPARATUS FOR CREATING, ASSEMBLING, AND ORGANIZING COMPOUND MEDIA OBJECTS

RELATED APPLICATIONS

The present application claims the benefit of U.S. Provisional Patent Application Ser. No. 60/562,351, filed Apr. 14, 2004, and incorporates that application by reference.

FIELD OF THE INVENTION

The present invention relates to media objects, and more particularly to creating, assembling, and organizing media objects.

BACKGROUND

Users often want to put together multiple digital media objects, such as digital photographs, for transfer or for storage. In the prior art, these digital media objects are either displayed next to each other, in a row, or in a two-dimensional array. However, as images get larger, and have higher resolutions, by displaying images in this manner, the detail of the images is obscured. Alternatively, on a smaller display screen such as a handheld device, the multiple image objects are each displayed on a separate page. Again, the user cannot easily visualize all of the images, while seeing how the images fit together.

SUMMARY OF THE INVENTION

A method and apparatus for assembling and organizing media objects is described.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

A method and apparatus for a user interface for enabling the use of compound media objects. In one embodiment, the system uses tool such as the compound media object creation interface (CMOCI). The compound media objects (CMOs) represent one or more media objects, which are available to the user. These compound media objects may be used to organize media objects, as well as to store media objects. The term media objects, or images, as used in the present application, should be understood to mean any objects that can be represented by a visual element, such as photographs, videos, documents, collections of items in a folder or album, icons, other visual representations of media objects, or icons, titles, or other data representing non-visual objects such as audio objects.

For simplicity, the term "stack" may be used in some instances to refer to a collection of objects laid on top of each other. In one embodiment, the stack makes visible at least a small portion of each of the objects within the stack. The term "heap" may be used, in one embodiment, to refer to a collection of stacks. In one embodiment, the heap makes visible at least a small portion of each stack within the heap.

Compound media objects may be implemented, in one embodiment, using static documents and in-line editing features. One implementation of such in-line editing of static documents is disclosed in co-pending application Ser. No. 11/106,164, filed on the same day as the present application. In that instance, the server interprets the page, and the page is sent as plain HTML to the client. In another embodiment, compound media objects may be implemented as dynamic documents, such as JavaScript, JavaApplet, Dynamic HTML, Flash, or other mechanisms.

Figure 1A:
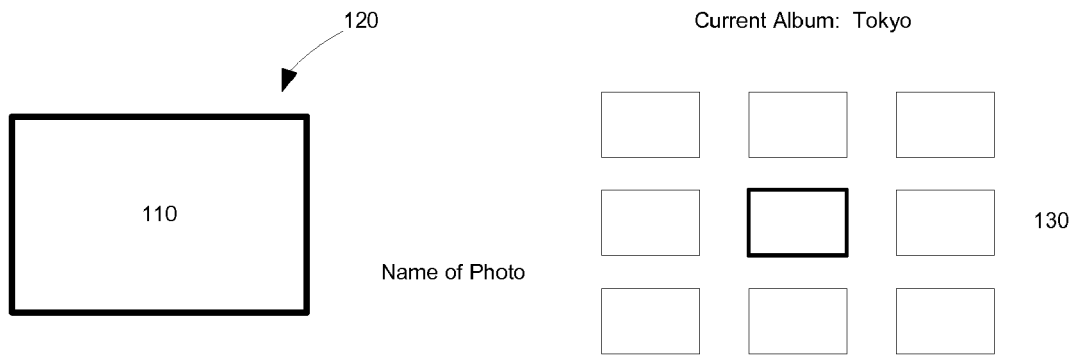
FIGS. 1A-1G illustrate various embodiments of various types of compound media objects, including some controls related to the compound media objects.

FIGS. 1A-1G illustrate various embodiments of various types of compound media objects, including some controls related to the compound media object creation interface (CMOCI). The CMOCI enables a user to add objects to the stack or heap, delete objects, edit objects, add annotations, and otherwise create the compound media object. FIG. 1A illustrates the stack 110 with one media object 120.

As can be seen, in one embodiment, the display includes, in addition to the stack 110 a set of thumbnails 130 of media objects that may be placed on the stack 110. Note that while the available media objects are shown as thumbnails 130 in this figure, alternative listing methods of additional media objects may be used. For example, the listing method may be titles of media objects, icons representing the media objects, or other representations. In one embodiment, the user may add media objects to the stack in other ways. For example, the user may upload a file and automatically have it added to the stack, the user may drag and drop files, or the user may add objects using other means of selection.

In one embodiment, the media objects that may be placed in the stack 110 are of different types. That is, a single stack may consist of photographs, videos, documents, folders, icons, and other items. In another embodiment, a stack consists of various media objects of the same type. In addition to the stack 110, there may be an ability to add a title or other meta-data to the media object. The title area displays the relevant metadata of the media object currently in focus, in one embodiment. In another embodiment, the title block may list the relevant metadata of all of the media objects in the stack.

In one embodiment, the top-most element has the focus, i.e. is available for editing. Visual effects or modifications are applied to the in-focus item. Furthermore, timing, audio data, notes, and other data may be added to the in-focus item. In one embodiment, the control items available to the user would automatically be selected to match the in-focus item. Thus, for example, if the in-focus item is a photograph some photographic editing tools may be made available by clicking on the media object. If the in-focus item is a document, a different set of editing tools may be made available when the user clicks on the item in the stack.

The controls that may be made available may include, for photographs: rotate, applying filters, removing red-eye, cropping, and other editing tools. The use of such editing tools for various types of media objects is known in the art, and an exhaustive list is not provided.

Figure 1B:
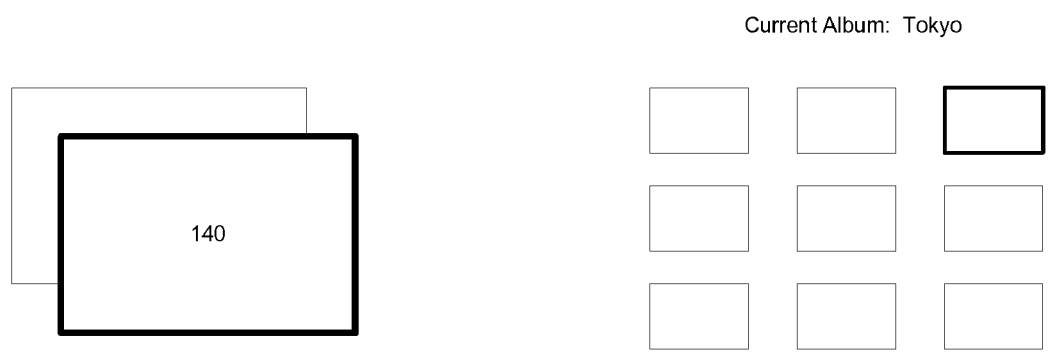

FIG. 1B illustrates the stack 110 with an additional media object placed on the stack. As can be seen, the focus is on the top media object 140. Note that although focus is indicated by a frame around the media object in the Figure, the focus indicator may be any icon, flag, notation, color, or other indicator. As will be described in more detail below, the in-focus media object may be edited in various ways. In one embodiment, the second media object is placed in a way to maximize the portion of the first media object that is visible. In one embodiment, a cascading top left corner algorithm is used to place the second media object. In other embodiments, a "first fit" or "random" algorithm may be used.

Figure 1C:
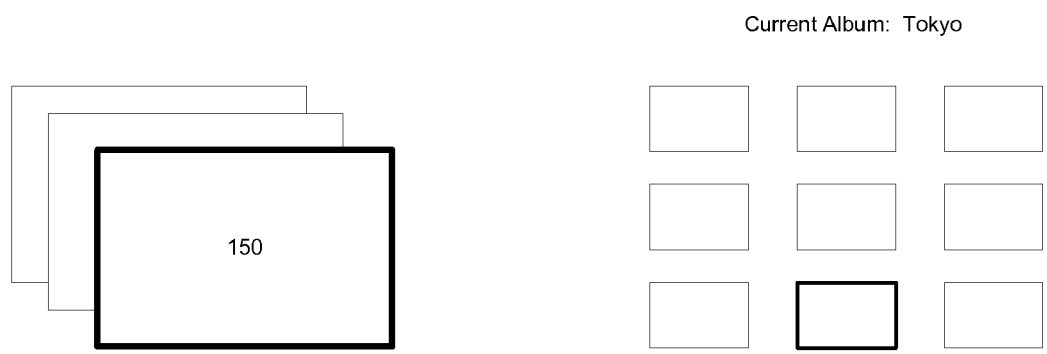
Figure 1D:
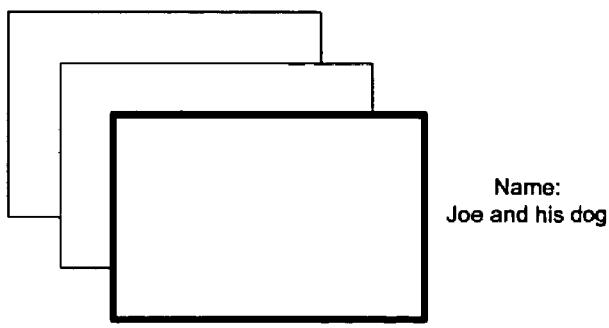
Figure 1D:
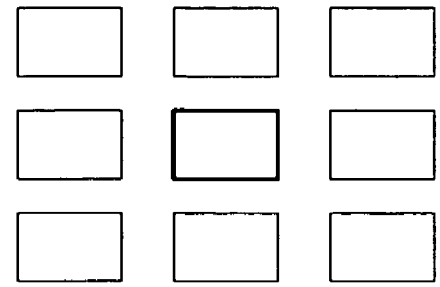
Figure 1E:
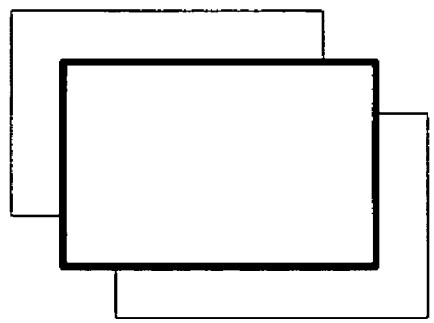
Figure 1E:
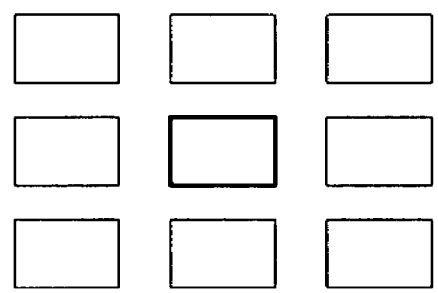
Figure 1F:
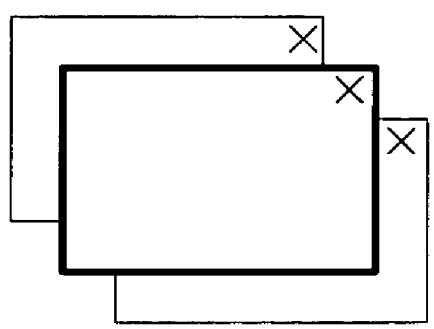
Figure 1F:
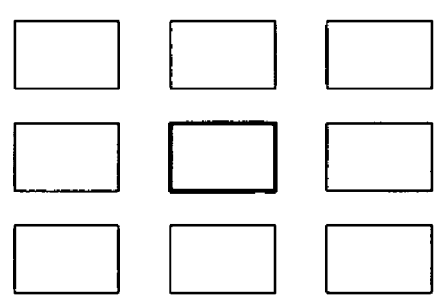

FIG. 1C illustrates the stack 110 with an additional media object on the stack 110, the top media object having the focus. FIGS. 1D-E illustrate the user's ability to rearrange the ordering of the media objects in the stack. As can be seen, by clicking on a media object, the user may move that media object into focus, thereby moving it to the top of the stack.

Figure 1G:
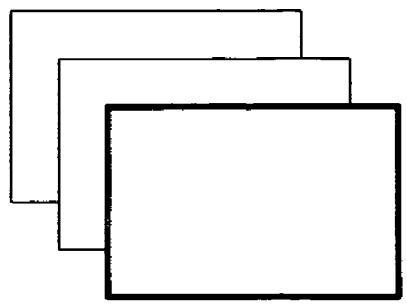
Figure 1G:
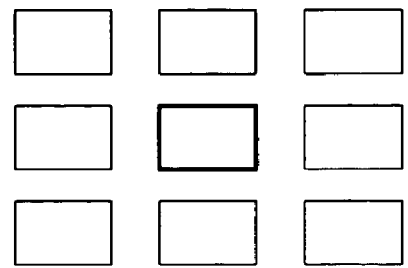

FIG. 1G illustrates one embodiment of the "send-to feature." A send-to button 190 enables the user to send the stack 110 to a recipient. In one embodiment, if the user clicks the send-to button, a set of data fields 195 appear. In another embodiment, the data fields 195 are always displayed, and the send-to button triggers actually sending the data.

In one embodiment, the from-area of the data fields 195 is automatically populated, when the user logs into the system. In one embodiment, the Title area may be automatically populated with the titles of the media objects in the stack. In one embodiment, the objects in the stack are sent as separate attachments.

Note that although the FIGS. 1A-G show up to three media objects in a stack, a larger or smaller maximum number of media objects in a stack may be set. In one embodiment, stacks that are deeper than a predetermined number of media objects are referred to as "heaps." In another embodiment, stacks refer to a temporary arrangement of media objects, while heaps refer to arrangements of media objects for storage. In one embodiment, stacks therefore may include an unlimited number of media objects. In another embodiment, the server administrator may set a maximum number of media objects in a stack. In another embodiment, the number of media objects in the stack may be set by the number of media objects visible.

Figure 5A:
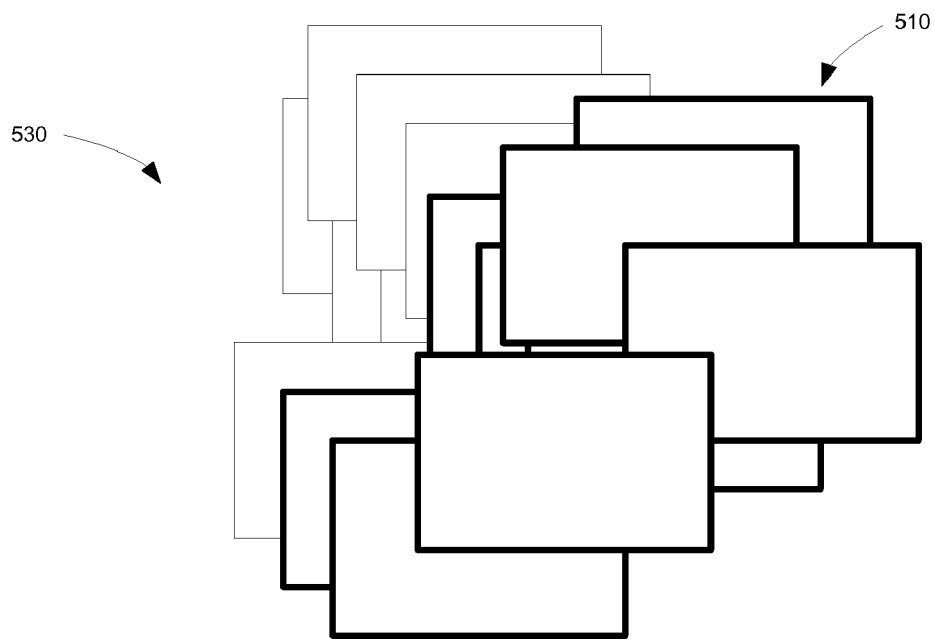
FIGS. 5A and 5B illustrate one embodiment of selecting a set of media objects in a compound media objects, and collapsing them into a single object.
Figure 5B:
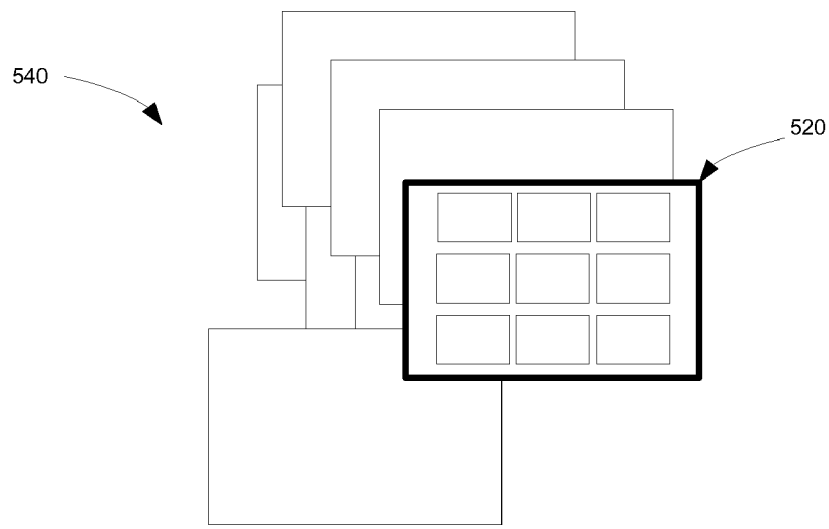

In one embodiment, a single element in the "stack" could represent a collection of multiple objects. In one embodiment, the multiple objects may be shown as a "collage." In another embodiment, the multiple objects may be shown as a list of titles, or other relevant metadata. The system may 'open up' a new stack, as the multi-object item is selected. Another stack or heap may be opened, upon selection of the multi-object item. In that instance, the number of items in the stack may be unlimited. In one embodiment, the user may select a set of media objects to collapse them into a single "collage stack item." This is shown in FIG. 5A-B.

Figure 2A:
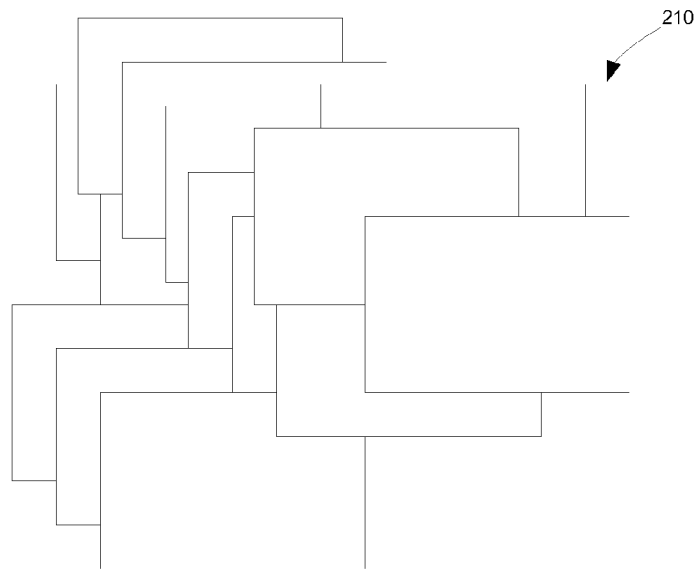
FIGS. 2A-2D illustrate various embodiments of types of compound media objects.

FIG. 2A-2D illustrate embodiments of various types of stacks or heaps. In one embodiment, the term "heap" is used to refer to stack-like arrangement of media objects for storage. FIG. 2A illustrates a heap 210, including a large number of media objects. As noted above, the total number of media objects in a heap 210 may be unlimited, or limited by the number of displayable media objects. In one embodiment, the heap may also include "collage heap items" shown in FIG. 5A-B.

Figure 2B:
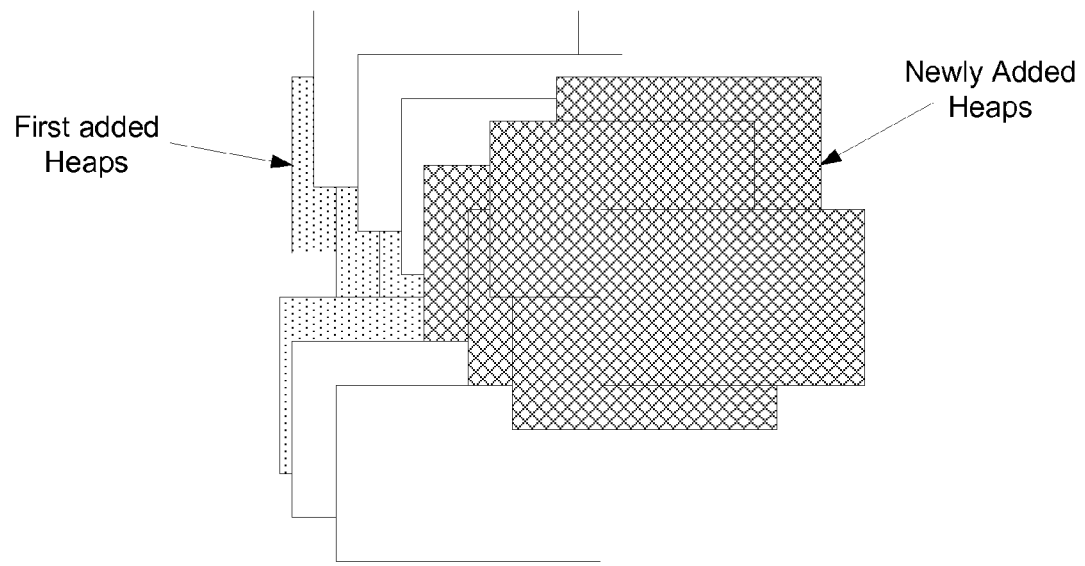

FIG. 2B illustrates one embodiment of the arrangement of the stack/heap. As can be seen, the heap includes media objects of various ages. In one embodiment, the newer media objects are put on top of the older objects.

Figure 2C:
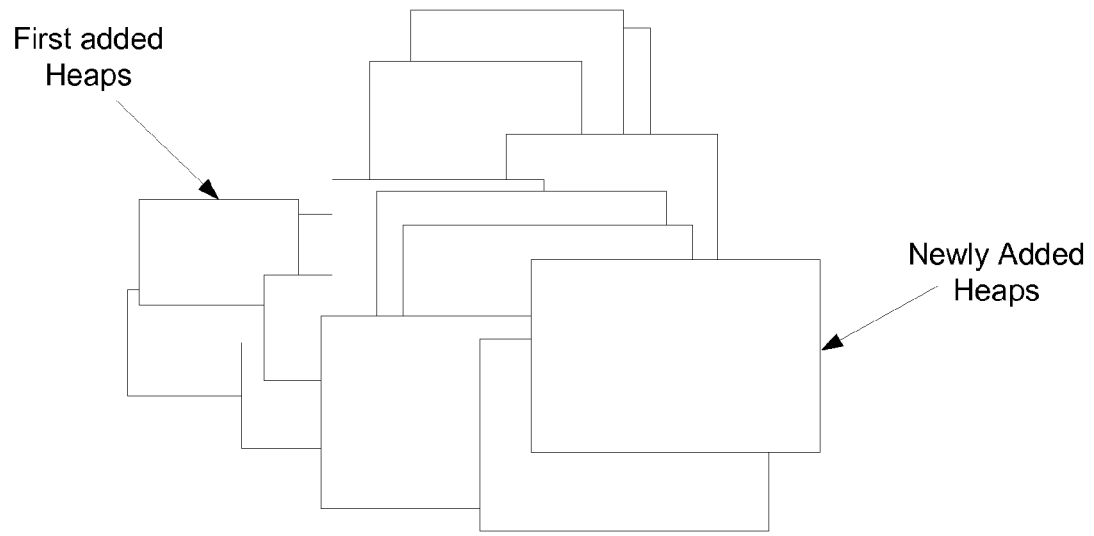
Figure 2D:
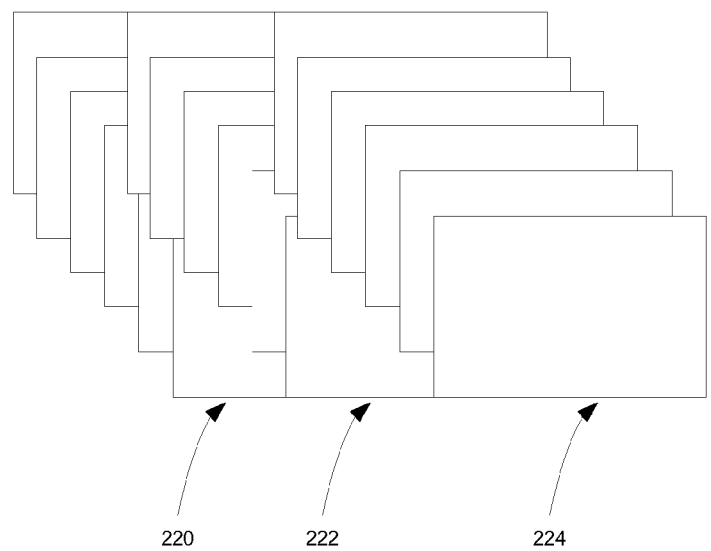

In one embodiment, shown in FIG. 2C, the older media objects are reduced in size, such that newer media objects are on top of the heap, and are larger, than older media objects. This enables the user to see newer media objects in a larger format, while providing visibility into a deep stack. In one embodiment, if the user selects a media object that is small (i.e. an older media object) the media object is enlarged as it is brought to the front of the stack. In other words, in one embodiment, the item(s) in focus on the stack are always of the best quality/size. In another embodiment, this can also be reversed, so that new images on the top of the stack or heap are smaller. This makes more of the rest of the heap easily visible. With bigger images on the top, less of the back of the heap or stack will be visible In one embodiment, shown in FIG. 2D, the heaps 220, 222, and 224 are organized in a geometric manner. While only a rectangular pattern is illustrated, the heaps 220, 222, and 224 may be organized in any format "random," "rectangular geometric," "oval geometric," or any other pattern that enables the system to show the media objects in the heap. Note that while this is discussed in terms of heaps, the same rules of layout apply to stacks. While stacks were only shown in small, geometrically laid out sets, they may alternatively be laid out randomly, or using another geometry.

In one embodiment, the layout depends on the available real estate on the user's display. In one embodiment, the system changes the distribution of the objects within the stack based on the area that holds the images. In one embodiment, the relative position of the stacks is changed, based on browser window size. In one embodiment, the stack/heap container area that holds all of the images is resized for actual screen size. The spacing between images may change, the size of images may change, and the arrangement of the images may change, as the browser window size changes. In one embodiment, the system attempts to optimize for visibility of objects, given the constraints of the number of objects in the stack and container div.

In one embodiment, if a user storing his or her media objects in a heap or stack uploads new media objects, the new media objects are automatically added to the top of the heap/stack.

In one embodiment, the CMO (compound media object, i.e. stack and/or heap) includes a "date association" which enables the user to bring forward media objects of a particular date. In one embodiment, the user may "reorganize" the heap by date. As media objects are added to the heap, the date that they are added is maintained in the system. The user may reorganize the heap by selecting a date. The heap is then reorganized so that media objects from that date are on top of the heap, with older media objects being below that level. In one embodiment, media objects above the newly selected "top of the heap" are put on the bottom of the heap. In one embodiment, this reorganization may be saved. In one embodiment, other metadata about the media objects may also be associated, including: colors, sizes, length if appropriate, date, author, keyword, owner, or other metadata. The CMOs may be organized by metadata selection, in one embodiment.

Figure 3A:
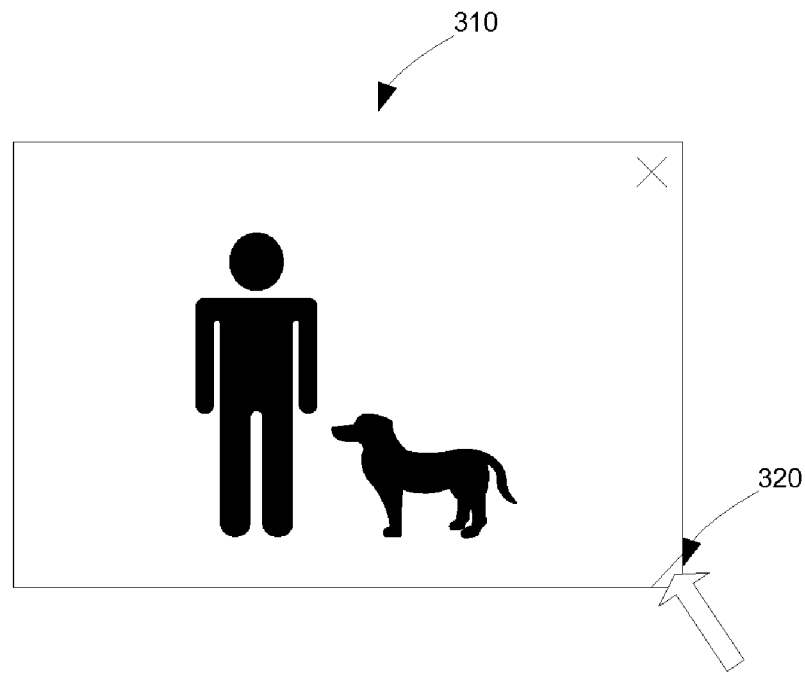
FIGS. 3A and 3B illustrate one embodiment of the mark-up ability.
Figure 3B:
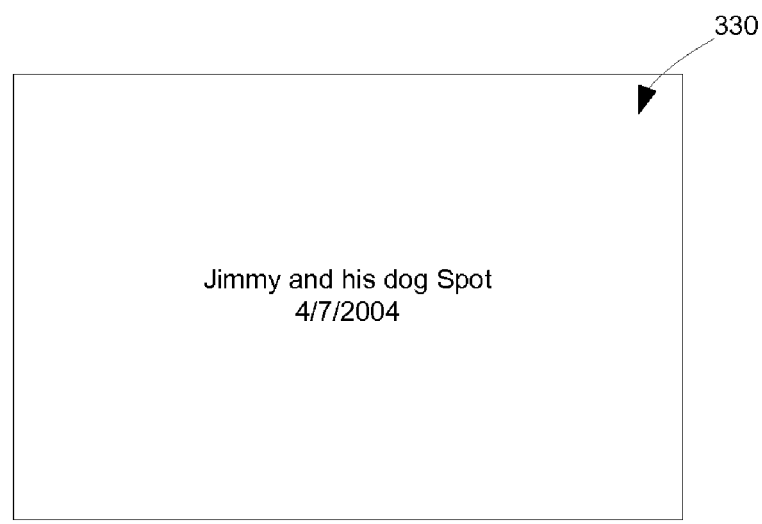

FIGS. 3A and 3B illustrate one embodiment of the mark-up ability. As can be seen, the media object may include one or more control areas. While in this Figure the control areas are shown on the media object itself, in another embodiment, the control areas may be located elsewhere on the screen. However, in one embodiment, the control areas are associated with the currently in-focus media object on the heap or stack (not shown on this Figure). One of the control areas 320 associate with a media object 310 may be a "add note on back" feature. In general, with physical media objects such as photographs, people put notes on the "back" of the photo.

This feature reproduces that experience, and permits a user to put metadata on the "back" of the media object. If the user clicks the control area 320, the media object is "flipped over" and the user is permitted to add meta-data. The meta-data, in one embodiment, is a "note" such as a title or date. However, other types of data, including any media objects or audio may be added as meta-data. In another embodiment, the metadata may be using a "stick-on note" or similar medium for showing the metadata associated with a media object. The "stick-on" may be translucent, so that it does not block the view of the media object. Alternative means of displaying metadata may be used, such as a separate pop-up window, a drop-down box, or any other format.

In one embodiment, the "back" of the media object is automatically populated with data about the media object. For example, the date the media object was recorded and/or downloaded may be on the "back" of the media object. In one embodiment, if a title is already associate with the media object, that may also be on the "back". Note that while the terms "flipping" and "back" are used, this is to explain the user experience. The actual data is simply associated with the media object in the database, in one embodiment, and a blank or populated area of the correct size is shown when the user "flips" the media object.

Figure 4A:
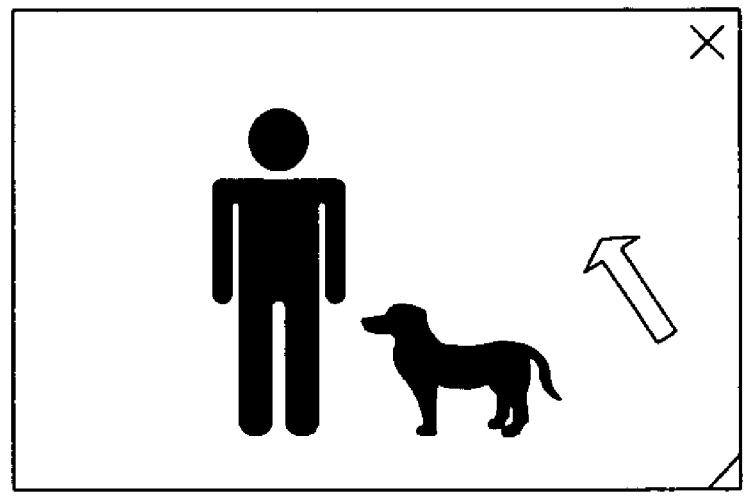
FIGS. 4A and 4B illustrate one embodiment of displaying controls on a media object in response to clicking on the media object.
Figure 4B:
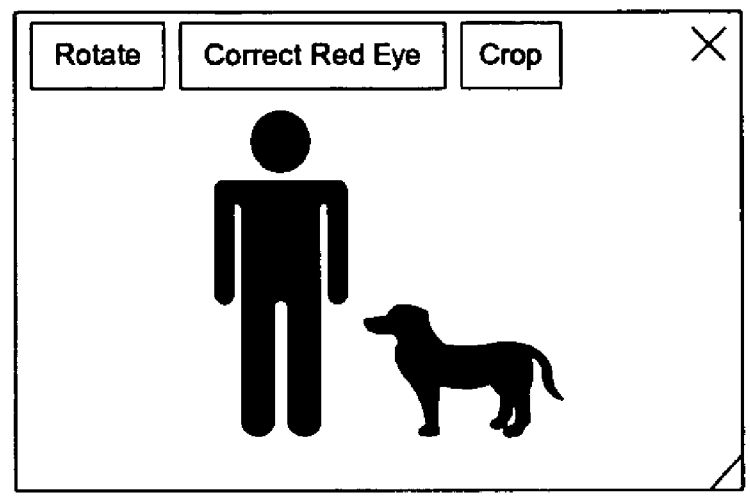

FIGS. 4A and 4B illustrate one embodiment of displaying controls on a media object in response to clicking on the media object. In one embodiment, the media object controls are not shown generally. However, if the user clicks on an in-focus media object, the controls are popped up. In one embodiment, the media controls are displayed over the media object itself. In one embodiment, the controls are transparent overlays, such that the entire image can still be discerned under the controls. In another embodiment, if the user clicks an "activation area" the controls are displayed adjacent to the media object.

FIGS. 5A and 5B illustrate one embodiment of selecting a set of media objects in a stack or heap, and collapsing them into a single collage object. In one embodiment, a single element 520 in the "stack" 540 could represent a collage of multiple elements. In one embodiment, the user may select a number of media objects 510 of the stack 530 (for example using shift-click or control-click or another mechanism). The user then can select "collapse set" to create a collage object 520. In one embodiment, this control may be available using the cursor right-click. Alternatively, this control may be displayed whenever more than one media object is selected. In another embodiment, this control may always be shown, or may appear with other controls, as described above.

In one embodiment, the system may 'open up' a new stack, as the multi-element item 520 is selected. In another embodiment, the collage object 520 may be opened onto the same stack (i.e. back into the original configuration of the stack 530 shown in FIG. 5A).

Figure 6:
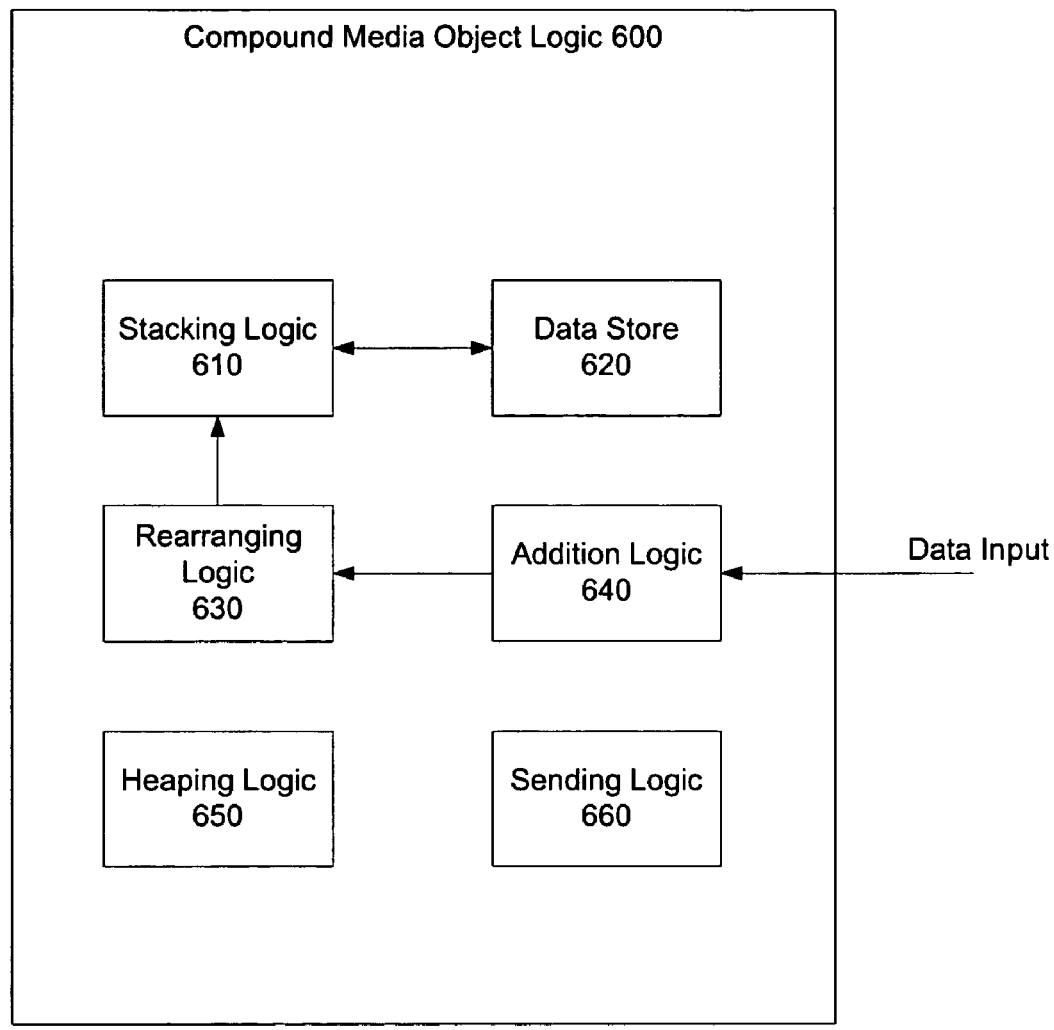
FIG. 6 is a block diagram of one embodiment of the compound media object creation logic.

FIG. 6 is a block diagram of one embodiment of the compound media object creation logic. In one embodiment, compound media object logic 600 resides on a server. In another embodiment, the logic 600 resides on a client device. In another embodiment, the elements may be split between a server and a client, interacting.

The logic 600 includes a stacking logic 610, to generate a stack from the media objects. In one embodiment, stacking logic 610 arranges the stack in a way to ensure that at least an edge of each media object in the stack is visible. In one embodiment, stacking logic 610 takes into account the available display area, or display window. The stacking logic 610, in one embodiment, optimizes to maximize the portion of each media object that is visible. In one embodiment, the closer to the top of the stack a media object is located, the larger a portion is made visible.

Data store 620 stores the media objects and associated metadata. In one embodiment, the data store 620 is a database. In an alternative embodiment, the data store 620 is flat file, or alternative storage mechanism.

The metadata associated with each media object, in one embodiment, is generated by the system. In one embodiment, the user may also add additional metadata. For example, for a photograph that's added to the stack, the system may generate one or more of the following bits of data: date added (to the stack), date taken, location taken, camera settings (when available). The user may add, for example, meta data such as title, description, identification of individuals in the photograph. One of skill in the art would understand that these types of metadata are merely exemplary, and different metadata may be used for different types of media objects. In one embodiment, the metadata may be used by the user to search for a photograph. In one embodiment, the metadata is automatically displayed for the currently active (top) media object on the stack.

Rearranging logic 630 enables a user to activate one or more objects in the stack and bring them to the top of the stack. The user may do this by selecting with a mouse or other selection tool, searching using metadata, or through other means. In one embodiment, the rearranging logic 630 enables the user to move multiple media objects to the top of the stack.

A rearranging example may be as follows. There are media objects that are from a first date, then a second set of media objects from a second more recent date, and a third set of media objects from a most recent date. The stacking logic 610 arranges these media objects by date added to the stack. However, the user may indicate that the media objects from the second, more recent date should be on top of the stack. The rearranging logic 630 then places the second set of media objects on top of the stack, over the third set of media objects. In one embodiment, other types of metadata may also be used to rearrange the stack. For example, the user may wish to put media objects from a particular location on top. Note that while this is described with respect to moving objects to the top of the stack, the same logic may be used to move objects into a different location within the stack.

Addition logic 640 enables the user or system to add one or more new media objects to the stack. In one embodiment, the stacking logic 610 places the new media objects on top of the stack. In one embodiment, if more than one media object is added at the same time, the stacking logic places them in an arbitrary order. In another embodiment, the objects are placed in the order selected by the user. Alternative methods of ordering newly added media objects may be used.

Heaping logic 650 enables the combination of multiple stacks into heaps. Heaps are stacks of stacks. In one embodiment, heaping logic 650 adds a differentiation for each stack within the heap. For example, the heaping logic 650 may add a border color for each image within a stack, so that the user can visually identify the members of the stack. In another embodiment, the heaping logic 650 may differentiate by having each stack with a different media object size. In another embodiment, the heaping logic 650 may differentiate by darkening heaps, as they move towards the bottom of the stack.

In an alternate embodiment, instead of heaping logic 650, when a stack is added to another stack, something else happens. The stacking logic 610 converts one or more of the stack(s) into collage objects. In one embodiment, each stack is converted into a single collage object. FIG. 5B illustrates an exemplary collage object.

Sending logic 660 enables the user to send one or more of the media objects from the stack to another user. In one embodiment, sending logic 660 sends the media objects in their "stacked" format if the recipient is a user of the same system, and is capable of receiving it in the stacked format. In one embodiment, if the user sends the media objects to someone outside the system, the sending logic 660 generates a package of the media objects in a format readable by other systems.

Figure 7:
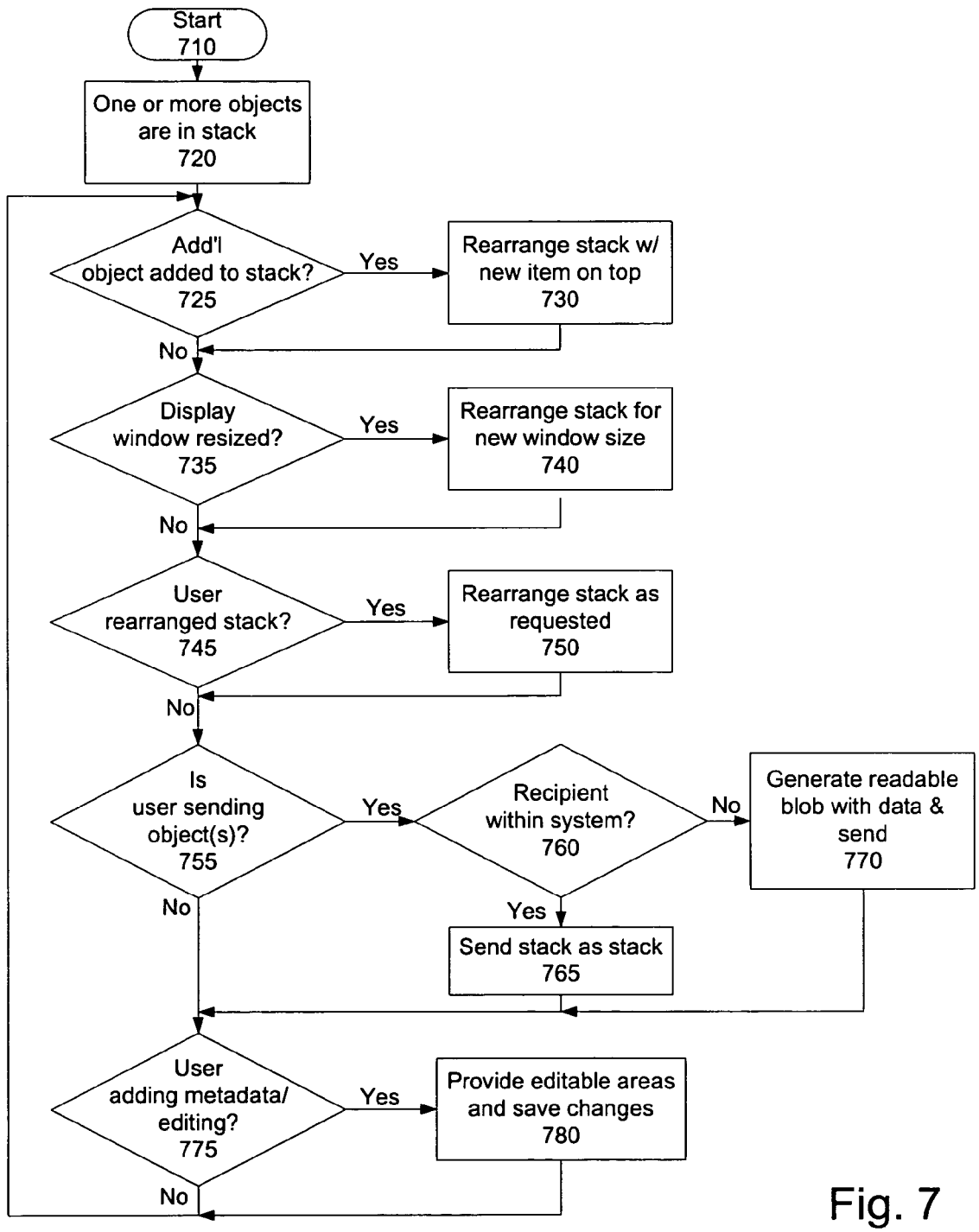
FIG. 7 is an overview flowchart of using the CMOCI.

FIG. 7 is an overview flowchart of using the stack. The process starts at block 710. At block 720, one or more objects are placed in a stack.

At block 725, the process determines if an additional object has been added to the stack. If so, the process continues to block 730, otherwise, the process continues to block 735.

At block 730, the process rearranges the stack, so that the newly added item is on top of the stack. In one embodiment, the rearranging may include moving media objects relative to each other, and resizing media objects.

At block 735, the process determines whether the display window has been resized. In general, the system has a known amount of space to arrange all of the media objects in the stack. If the display window has been resized, the process continues to block 740. Otherwise, the process continues to block 745.

At block 740, the process rearranges the stack, to optimize for the resized display window. In one embodiment, the rearranging may include moving media objects relative to each other, and resizing media objects.

At block 745, the process determines whether the user has rearranged the stack. In one embodiment, the user can rearrange the stack by physically selecting and moving media objects, or by performing a search or other reorganization maneuver. If so, at block 750, the process rearranges the stack as requested by the user. The process then continues to block 755.

At block 755, the process determines whether the user has selected a "send" option. The system, in one embodiment, easily allows a user to send the stack of images to another user. In one embodiment, the user may select a subset of media objects within the stack for sending. If the user has selected a send option, the process continues to block 760.

At block 760, the process determines whether the recipient is within the same system, or is capable of receiving stack formatted data. If so, the process sends the stack, in the stack format, at block 765. If the recipient is outside the system, the process, at block 770, generates a blob of data including the selected media objects that can be interpreted by other systems. The process then continues to block 775.

At block 775, the process determines whether the user has chosen to add metadata or edit the images. If so, at block 780, the system provides editable areas for the user to enter metadata, or select editing options. In one embodiment, the inline editing technique described in co-pending application Ser. No. 11/106,164 is used for such techniques. In one embodiment, the system saves the changes made by the user. In one embodiment, the process described in co-pending application Ser. No. 11/106,203 is used to save stacks of edits in a reversible way.

The process then loops back to block 720. Note that while these options have been described in the form of a flowchart, one of skill in the art would understand that this is merely to shown the possible options. In one embodiment, the system concurrently monitors for all of the above actions. In one embodiment, the system is interrupt driven, and each of the above actions generates an interrupt or prompt, which causes the system to handle the occurrence.

Figure 8:
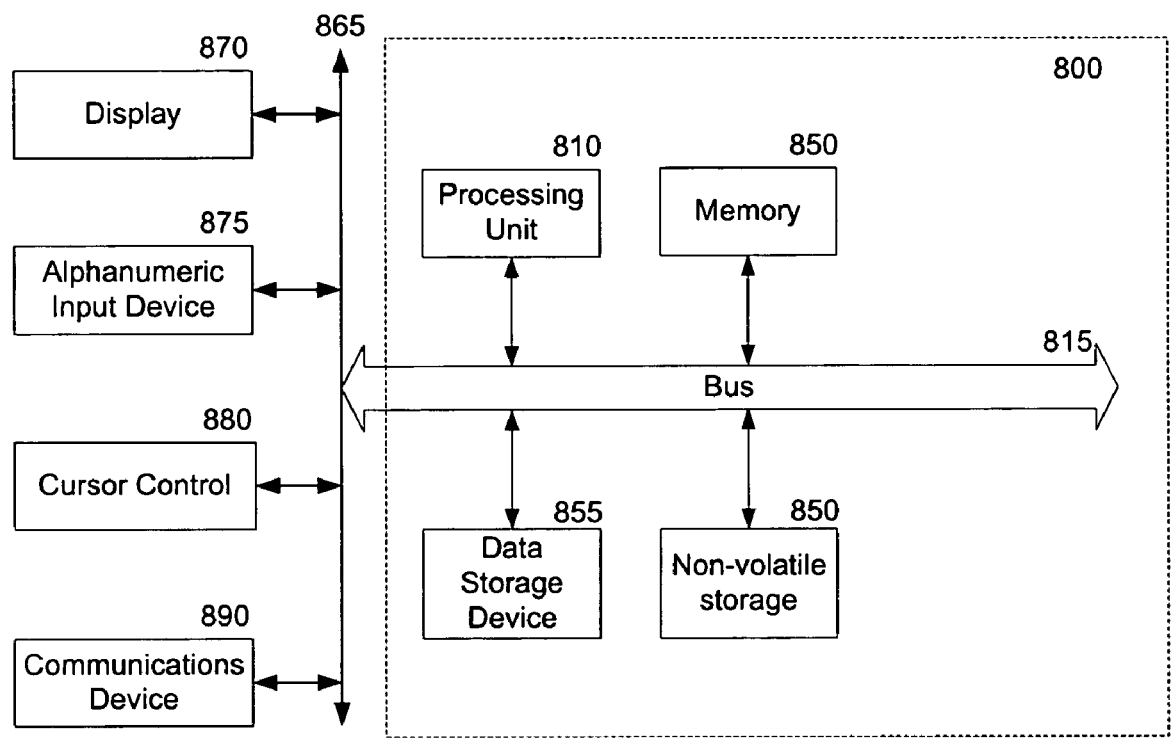
FIG. 8 illustrates one embodiment of a computer system which may be used with the present invention.

FIG. 8 is one embodiment of a computer system that may be used with the present invention. It will be apparent to those of ordinary skill in the art, however that other alternative systems of various system architectures may also be used.

The data processing system illustrated in FIG. 8 includes a bus or other internal communication means 815 for communicating information, and a processor 810 coupled to the bus 815 for processing information. The system further comprises a random access memory (RAM) or other volatile storage device 850 (referred to as memory), coupled to bus 815 for storing information and instructions to be executed by processor 810. Main memory 850 also may be used for storing temporary variables or other intermediate information during execution of instructions by processor 810. The system also comprises a read only memory (ROM) and/or static storage device 820 coupled to bus 815 for storing static information and instructions for processor 810, and a data storage device 825 such as a magnetic disk or optical disk and its corresponding disk drive. Data storage device 825 is coupled to bus 815 for storing information and instructions.

The system may further be coupled to a display device 870, such as a cathode ray tube (CRT) or a liquid crystal display (LCD) coupled to bus 815 through bus 865 for displaying information to a computer user. An alphanumeric input device 875, including alphanumeric and other keys, may also be coupled to bus 815 through bus 865 for communicating information and command selections to processor 810. An additional user input device is cursor control device 880, such as a mouse, a trackball, stylus, or cursor direction keys coupled to bus 815 through bus 865 for communicating direction information and command selections to processor 810, and for controlling cursor movement on display device 870.

Another device, which may optionally be coupled to computer system 800, is a communication device 890 for accessing other nodes of a distributed system via a network. The communication device 890 may include any of a number of commercially available networking peripheral devices such as those used for coupling to an Ethernet, token ring, Internet, or wide area network. The communication device 890 may further be a null-modem connection, or any other mechanism that provides connectivity between the computer system 800 and the outside world. Note that any or all of the components of this system illustrated in FIG. 8 and associated hardware may be used in various embodiments of the present invention.

It will be appreciated by those of ordinary skill in the art that any configuration of the system may be used for various purposes according to the particular implementation. The control logic or software implementing the present invention can be stored in main memory 850, mass storage device 825, or other storage medium locally or remotely accessible to processor 810.

It will be apparent to those of ordinary skill in the art that the system, method, and process described herein can be implemented as software stored in main memory 850 or read only memory 820 and executed by processor 810. This control logic or software may also be resident on an article of manufacture comprising a computer readable medium having computer readable program code embodied therein and being readable by the mass storage device 825 and for causing the processor 810 to operate in accordance with the methods and teachings herein.

The present invention may also be embodied in a handheld or portable device containing a subset of the computer hardware components described above. For example, the handheld device may be configured to contain only the bus 815, the processor 810, and memory 850 and/or 825. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of the present invention for such a device would be apparent to one of ordinary skill in the art given the disclosure of the present invention as provided herein.

The present invention may also be embodied in a special purpose appliance including a subset of the computer hardware components described above. For example, the appliance may include a processor 810, a data storage device 825, a bus 815, and memory 850, and only rudimentary communications mechanisms, such as a small touch-screen that permits the user to communicate in a basic manner with the device. In general, the more special-purpose the device is, the fewer of the elements need be present for the device to function. In some devices, communications with the user may be through a touch-based screen, or similar mechanism.

It will be appreciated by those of ordinary skill in the art that any configuration of the system may be used for various purposes according to the particular implementation. The control logic or software implementing the present invention can be stored on any machine-readable medium locally or remotely accessible to processor 810. A machine-readable medium includes any mechanism for storing or transmitting information in a form readable by a machine (e.g. a computer). For example, a machine readable medium includes read-only memory (ROM), random access memory (RAM), magnetic disk storage media, optical storage media, flash memory devices, electrical, optical, acoustical or other forms of propagated signals (e.g. carrier waves, infrared signals, digital signals, etc.).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A computer implemented method comprising:
    displaying a plurality of media objects in a stack in a display window on a display device coupled with the computer, the stack designed to simultaneously show at least one portion of each media object in the stack;
    enabling a user to arbitrarily rearrange the stack, wherein a set of media objects are brought to a top of the stack based on common metadata associated with each media object selected by the user;
    displaying a plurality of stacks in a heap, the heap differentiating between stacks, and making visible at least one portion of each stack;
    upon resizing of the display window, rearranging the media objects in the stack relative to one another within the display window to optimize for a new display window sizing, wherein the closer to a top of the stack a media object is located the larger a portion of the media object is made visible, wherein a larger portion of a first and second media object located closer to the top of the stack is displayed relative to a third and fourth media object located farther away from the top of the stack;
    receiving a selection of a subset of media objects from the stack to be sent to a second user in a stack arrangement;
    determining that the second user can receive stack formatted data; and
    transmitting the subset of media objects to the second user as a stack to be displayed by the second user in the stack arrangement.

2. The computer implemented method of claim 1, further comprising:
    associating metadata with each media object in the stack.

3. The computer implemented method of claim 2, wherein the metadata includes one or more of the following: an editable title and a date added.

4. The computer implemented method of claim 3, further comprising:
    enabling the user to rearrange the stack by date, by selecting a date to bring to the front of the stack.

5. The computer implemented method of claim 1, further comprising:
    receiving a new media object to be placed on the stack; and
    placing the new media object on top of the stack, such that the stack mimics a naturally organized physical stack.

6. The computer implemented method of claim 5, further comprising:
    enabling the user to bring to the top of the stack any item in the stack, by selecting the item.

7. The computer implemented method of claim 5, further comprising:
    enabling the user to bring to the top of the stack a set of items.

8. The computer implemented method of claim 7, wherein the set of items may be identified by one or more of the following: date added to the stack, date taken, subject, or location.

9. The computer implemented method of claim 1,
    wherein the heap is displayed as a single collage media object within the stack.

10. A server computer system comprising:
    a memory to store media objects; and
    a processor coupled with the memory that includes:
        a stacking logic to
            arrange a plurality of media objects in a stack, the stack designed to simultaneously show at least one portion of each media object in the stack in a display area on a client display device,
            rearrange the media objects in the stack in the display area with respect to each other upon resizing of the display area to optimize the rearranged stack for the display area, the closer to a top of the stack a media object is located the larger a portion of the media object is made visible, wherein a larger portion of a first and second media object located closer to the top of the stack is displayed relative to a third and fourth media object located farther away from the top of the stack;
        a heaping logic to generate a heap, a heap comprising a plurality of stacks; the heaping logic differentiating between the plurality of stacks, and making visible at least one portion of each of the plurality of stacks;

rearranging logic to enable a user to arbitrarily rearrange the stack, wherein a set of media objects are brought to a top of the stack based on common metadata associated with each media object selected by the user; and a sending logic to receive a selection of a subset of media objects from the stack to be sent to a second user in a stack arrangement, determine that the second user can receive stack formatted data, and transmit the subset of media objects to the second user as a stack to be displayed by the second user in the stack arrangement.

11. The system of claim 10, further comprising:
a data store to store metadata associated with each media object.

12. The system of claim 11, wherein the metadata includes one or more of the following: an editable title and a date added.

13. The system of claim 12, further comprising:
the rearranging logic to enable the user to move media objects in the stack to the top of the stack.

14. The system of claim 13, wherein the rearranging logic is further to enable the user to move multiple media objects in the stack to the top of the stack.

15. The system of claim 14, wherein the set of items may be identified by one or more of the following: date added to the stack, date taken, subject, or location.

16. The system of claim 10, further comprising:
an addition logic to enable addition a new media object on the stack; and
the stacking logic to place the new media object on top of the stack.

17. The system of claim 10, wherein the rearranging comprises one or more of the following: resizing the media objects in the stack, and moving the media objects with respect to each other.

18. The method of claim 1, further comprising:
enabling the moving forward of any media object in the stack with a single click.

19. The method of claim 1, wherein the plurality of media object in the stack include a plurality of different types of media objects.

* * * * *